Aug. 25, 1964  D. G. PEARSON  3,145,519
ROTARY LAWN MOWER

Filed June 18, 1962  2 Sheets-Sheet 1

INVENTOR.
Donald G. Pearson
BY
Atty

Aug. 25, 1964
D. G. PEARSON
3,145,519
ROTARY LAWN MOWER
Filed June 18, 1962
2 Sheets-Sheet 2
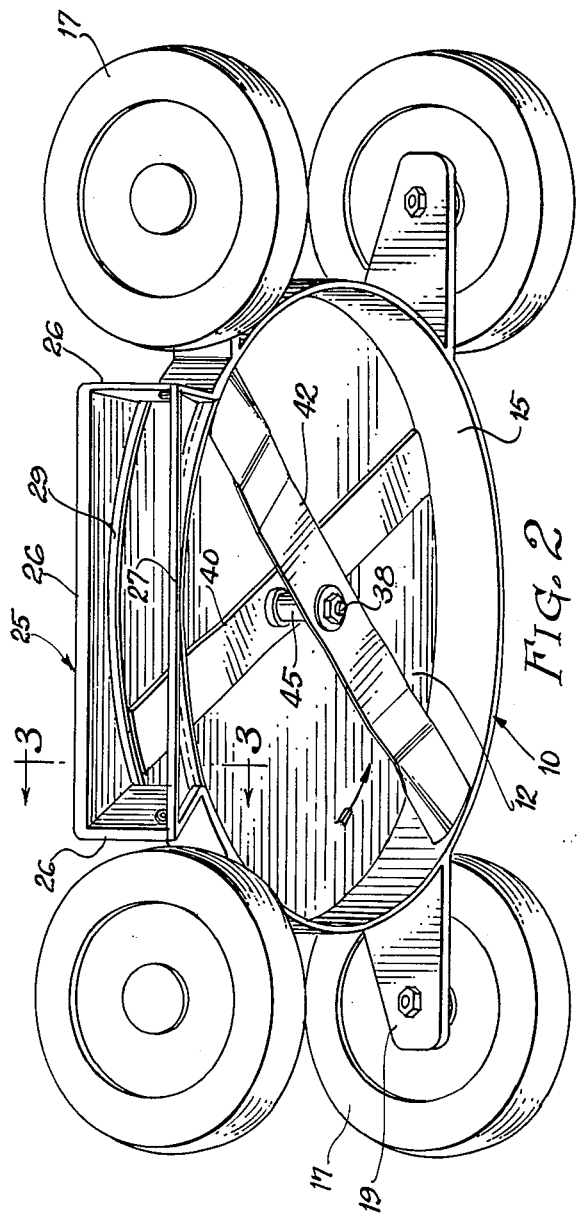
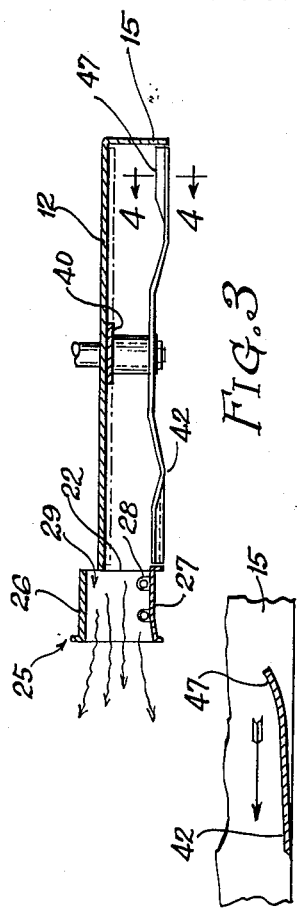
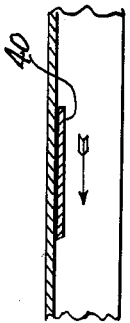
INVENTOR.
Donald G. Pearson 3,145,519
ROTARY LAWN MOWER
Donald G. Pearson, Newark, Ohio, assignor to Sears, Roebuck and Co., Chicago, Ill., a corporation of New York
Filed June 18, 1962, Ser. No. 203,260
4 Claims. (Cl. 56—25.4)

My invention relates to rotary power-driven lawn mowers of the type characterized by a cutter blade rotating on a substantially vertical shaft within a housing, with a motor mounted thereabove.

A particular object of my invention is to provide a device of the character referred to with improved means for ejecting from the housing substantially all of the grass as it is cut, the device being so designed that substantially none of the cut grass is allowed to accumulate within the housing.

A further object of my invention is to provide, in a device of the character referred to, a pair of coaxial blades mounted on a drive shaft in spaced relation within a housing, the lower of said blades being especially designed for cutting grass while the upper blade is disposed closely adjacent the top and sides of the housing where it serves as a wiper keeping the housing substantially clean of grass, a discharge chute being provided for lateral ejection of the cuttings from the housing and at least one of the blades being so designed as to generate a stream of air moving upward and centrifugally through the housing to discharge the cuttings quickly and efficiently.

Still another object is to provide such a device which is simple in design, inexpensive to fabricate, and generally satisfactory.

My invention will be more clearly understood by reference to the appended drawings forming a part of this specification, wherein FIG. 1 is a top perspective view showing a rotary mower embodying my invention, but omitting the motor;

FIG. 2 is a bottom perspective view of the same;

FIG. 3 is a sectional view taken substantially along the line 3—3 of FIG. 2;

FIG. 4 is a fragmentary sectional view, on an enlarged scale, taken substantially along the line 4—4 of FIG. 3, and FIG. 5 is a fragmentary sectional view taken substantially along the line 5—5 of FIG. 2.

Figure 1:
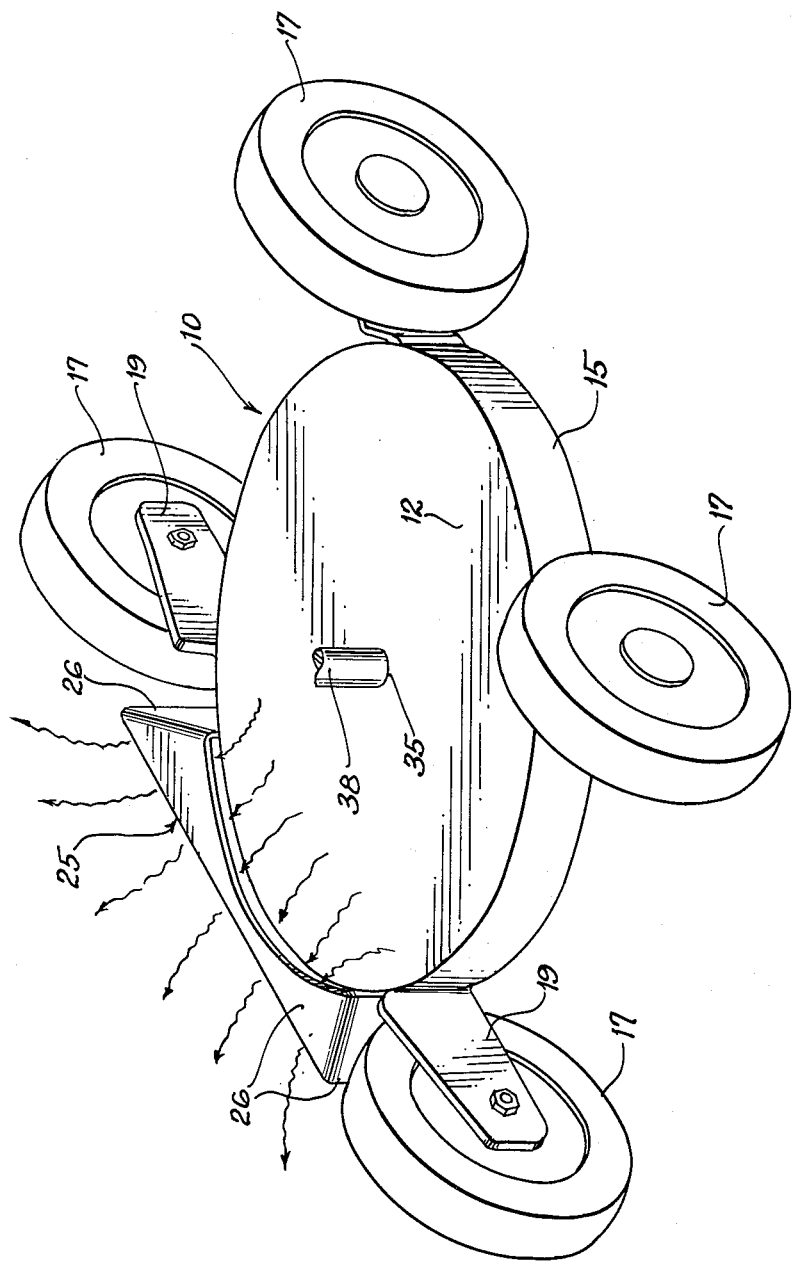

A preferred embodiment of mower embodying my invention comprises a housing 10 generally in the form of a relatively shallow cylinder having a generally circular and flat top wall 12 and a side wall 15 depending as a skirt from said top wall 12. Wheels or casters 17 are rotatably carried by brackets 19, secured by brazing, welding or the like, to the skirt 15. It will be understood that, in accordance with common practice, a motor and motor housing (not shown) will be mounted above housing 10.

Skirt 15 is provided with an opening 22 adjacent which is mounted a discharge chute 25 (FIG. 3). This chute has a U-form member providing top wall 26 and side walls 26a and 26b; a bottom wall 27 being secured thereto as by bolts 28 and serving as a guard plate as described below. Top wall 26 extends a relatively slight distance above cover 12 of housing 10 to provide a slot or passage 29 between said cover 12 and top plate 26 of chute 25, for a purpose which will hereinafter appear.

Through an aperture 35 in top wall 12 of housing 10 extends a drive shaft 38 actuated by a motor (not shown) mounted above housing 10 in accordance with common practice in this art. Keyed to shaft 38 within housing 10 is a pair of blades 40 and 42, these blades being spaced apart by means of a spacer sleeve 45 and fixedly arranged at an angle of about 90° to each other, as seen in FIG. 2.

Lower blade 42, disposed adjacent the lower edge of skirt 15, serves as a cutter blade, the outer extremities of said blade 42 being fitted rather close to the inner edge of skirt 15 and substantially in line with plate 27 of the discharge chute, to prevent build-up of cuttings at this point. Said cutter blade 42 is generally of a more or less straight gull type, the extremities of said blade having a longitudinal arcuate lip portion 47 as seen best in FIGS. 3 and 4. The cutter blade, by reason of this configuration, not only functions efficiently to cut the grass over which the mower is drawn but also creates an upward draft of air which finds its escape from the housing at opening 22 and through the discharge chute 25.

Upper blade 40 is a relatively straight, flat and narrow plate fitted close to the bottom face of housing cover 15, the tips of said blade 40 having an arcuate edge to conform to the curvature of skirt 15, so that this blade 40 functions effectively as a wiper, keeping the underside of plate 12 as well as the inside of skirt 15 substantially free of an accumulation of cuttings. Said upper blade 40 also functions as a secondary air pump, assisting cutter blade 42 in providing an upward and centrifugal flow of air through the housing and out of discharge chute 25.

The operation of the mower embodying my invention will be obvious from what has been described above. As the grass is cut by cutter blade 42, a strong current of air will be drawn upwardly into housing 10 and out through discharge chute 25. The relatively high velocity of air passing through the discharge chute, which, it will be noted, flares outwardly, creates a venturi effect, sucking air into the discharge chute at opening 29 and thus accelerating the flow and readily promoting efficient discharge of the cut grass and preventing accumulation of cuttings within the housing. As a result of this action, air flow across the underside of the discharge chute will provide a cushion or boundary layer effect preventing the cuttings discharged through the chute from adhering to the underside of said chute.

Thus, mowers embodying my invention are characterized in that the inside of the housing 10 is automatically kept clean under substantially all operating conditions, while the cuttings are uniformly dispersed as discharged, leaving no appreciable clumps of cut grass in any cut area.

A further valuable advantage accruing to mowers embodying my invention is an overall substantial reduction in power requirement by reason of the elimination of the usual power-absorbing build-up of grass inside the mower housing.

If desired, a grass catcher of known or other suitable design may be attached to the discharge chute.

Various changes coming within the spirit of my invention will suggest themselves to those skilled in the art; hence, I do not wish to be limited to the specific embodiment shown and described or uses mentioned, but intend the same to be merely exemplary, the scope of my invention being limited only by the appended claims.

I claim:

1. A rotary mower, comprising
   (a) a housing having a substantially flat cover and a peripheral skirt depending from said cover,
   (b) said skirt having a discharge opening therein,
   (c) a drive shaft extending through said cover into said housing,
   (d) an upper and a lower blade in said housing axially spaced on said shaft for rotation therewith,
   (e) the upper blade being disposed close to said cover and extending close to said skirt, functioning to prevent substantial accumulation of cuttings on the inside of said cover and skirt,
   (f) the lower blade being a cutter, (g) at least one of said blades also creating a current of air upwardly and centrifugally of the housing to discharge the cuttings through said discharge opening, (h) a chute extending laterally from said housing adjacent said discharge opening for discharging cuttings remotely from the housing, (i) said chute in conjunction with said housing defining a slot opening into said chute, whereby air is sucked into said chute when the mower is in operation to accelerate the discharge of cuttings as the cuttings are discharged from the mower housing.

2. A mower as in claim 1, wherein the chute has (a) side wall portions extending a slight distance above said housing, (b) a top wall portion joining said side wall portions, (c) and a bottom wall portion, (d) said chute having an enlarged mouth portion, and said top and side wall portions in conjunction with said cover defining a slot which opens into said chute.

3. A mower as in claim 2, wherein the bottom wall portion is detachable from the side wall portions and is disposed substantially coplanar with and close to the cutter blade, said bottom wall serving as a safety bar to prevent injury to an extremity of the operator and also as a skid plate to prevent scalping when the mower is moved over uneven terrain.

4. A rotary mower, comprising, (a) a housing having a substantially flat cover and a peripheral skirt depending from said cover, (b) said housing having a discharge opening therein, (c) a drive shaft extending through said cover into said housing, (d) an upper and a lower blade in said housing axially spaced on said shaft for rotation therewith, (e) the upper blade being disposed close to said cover and extending close to said skirt, functioning to prevent substantial accumulation of cuttings on the inside of said cover and skirt, (f) the lower blade being a cutter, (g) at least one of said blades also creating a current of air upwardly and centrifugally of the housing to discharge the cuttings through said opening, (h) a discharge chute supported by said housing and communicating with said opening for discharging cuttings from inside the housing, (i) said chute having a wall displaced outwardly from said housing and defining therewith a slot opening into said chute above said housing, whereby air is sucked into said chute when the mower is in operation to accelerate the discharge of cuttings as the cuttings are discharged from the mower housing.

References Cited in the file of this patent

UNITED STATES PATENTS

| | | |
|---|---|---|
| 2,641,100 | Sylvester | June 9, 1953 |
| 2,957,295 | Brown | Oct. 25, 1960 |
| 2,984,919 | Stoddard | May 23, 1961 |
| 3,008,283 | Wood | Nov. 14, 1961 |
| 3,008,284 | Bright | Nov. 14, 1961 |